(12) United States Patent
Furuichi et al.

(10) Patent No.: US 8,747,279 B2
(45) Date of Patent: Jun. 10, 2014

(54) DRIVING FORCE TRANSMISSION DEVICE

(75) Inventors: Jun Furuichi, Shizuoka (JP); Kuniaki Miyake, Fujisawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 13/819,425

(22) PCT Filed: Jul. 26, 2011

(86) PCT No.: PCT/JP2011/066886
§ 371 (c)(1),
(2), (4) Date: Mar. 22, 2013

(87) PCT Pub. No.: WO2012/029443
PCT Pub. Date: Mar. 8, 2012

(65) Prior Publication Data
US 2013/0168197 A1 Jul. 4, 2013

(30) Foreign Application Priority Data
Aug. 31, 2010 (JP) ................................. 2010-193089

(51) Int. Cl.
*B60W 10/02* (2006.01)
(52) U.S. Cl.
USPC ............................................................. 477/5
(58) Field of Classification Search
USPC ............ 192/85.39, 85.17, 85.24, 85.23, 85.2, 192/85.19, 85.01, 82 R; 477/5
See application file for complete search history.

(56) References Cited

U.S. PATENT DOCUMENTS

| | | | |
|---|---|---|---|
| 6,484,858 B1 * | 11/2002 | Mimura | 192/45.006 |
| 8,286,773 B2 * | 10/2012 | Nakamura et al. | 192/70.12 |
| 8,640,844 B2 * | 2/2014 | Kuwahara et al. | 192/85.53 |
| 2008/0093195 A1 * | 4/2008 | Christensen et al. | 192/85 R |
| 2008/0296123 A1 * | 12/2008 | Vu et al. | 192/85 AA |

FOREIGN PATENT DOCUMENTS

JP 2010-151313 7/2010

* cited by examiner

*Primary Examiner* — David D Le
*Assistant Examiner* — David J Hlavka
(74) *Attorney, Agent, or Firm* — Young Basile

(57) ABSTRACT

A hybrid driving force transmission device is provided with a multiple-plate dry clutch, a piston, a piston arm, a return spring, bellows elastic seal components and an arm fixing plate. The return spring applies biasing force to the piston arm in the release direction of the clutch, during the release period of the multiple-plate dry clutch. The bellows elastic seal member is secured or maintained in a position on the side wall of a clutch drum and seals a through hole and arm distal end from the clutch chamber, and undergoes an elastic deformation following the stroke movement of the arm distal end. The arm fixing plate is integrally provided with the bellows elastic seal member, is fixed to the arm distal end, and when the multiple-plate dry clutch is engaged, is configured to contact the clutch plate for transferring the clutch engagement force.

4 Claims, 6 Drawing Sheets

DRIVING FORCE TRANSMISSION DEVICE

TECHNICAL FIELD

The present invention relates to a driving force transmission device applied to the vehicle drive system or driveline in which a dry clutch for selectively connecting and disconnecting driving force transmission is disposed in a clutch chamber divided by a seal.

BACKGROUND

Conventionally, in a hybrid drive force transmission device in which a dry clutch for selectively connecting and disconnecting driving force transmission is arranged in a clutch chamber that is partitioned by a partitioning seal, the partitioning seal structure with a resilient or elastic seal member and a transfer plate is known. See, for example, Japanese Laid-Open Patent Application No. 2010-151313.

The elastic seal member is positioned and fixed to a side wall of the clutch drum and is deformed to follow the stroke motion of the distal end portion of a piston arm. A transfer plate is provided integrally with the elastic sealing member, and at the engagement of the dry clutch, the transfer plate is brought into contact with a clutch plate to transmit clutch engagement force.

However, the conventional hybrid drive force transmission device of the prior art is configured to allow the transfer plate to make a surface contact with a front end surface of the front end of piston arm with the transfer plate and give the biasing force of a return spring to the piston arm only. Therefore, in the transition period of clutch release in which the dry clutch shifts from the engagement state to the release or open state, when the transfer plate is being in close contact with the clutch plate, the piston arm may be urged to retreat for a backward stroke prior to the transfer plate by the urging force of the return spring. In this instance, until the transfer plate has left the clutch plate, the problem of delay in clutch release response was encountered.

Further, in the open state of the dry clutch, the biasing force by the return spring is applied only to the piston arm, and the transfer plate is only elastically supported by the elastic seal member. Therefore, there is a problem that, when there is vibration input and the like to the transfer plate, the transfer plates vibrates along the input direction to contact the clutch plate thereby reducing the gap between clutch plates with causing the occurrence of drag between the clutch plates.

BRIEF SUMMARY

The present invention has been made by focusing on the problems described above, and is intended to provide a driving force transmission device which can achieve an improved release or opening response in the clutch release transitional period with an anti-drag of the clutch plate during the open or release state of the clutch.

To achieve the above object, the driving force transmission device of the present invention, is provided with a dry clutch, a piston, a piston arm, a return spring, a elastic seal member, and an arm fixing plate. The dry clutch is provided between a clutch hub and a clutch drum in a driving force transmission system or driveline and connects and disconnects the driving force due to clutch engaging or clutch disengaging operation.

The piston is slidably disposed in the housing member and moves or strokes in the direction of clutch engagement by oil pressure when the dry clutch is engaging. The piston arm is slidably disposed in a through hole formed in a side wall of the clutch drum. The arm distal end projecting into the clutch chamber accommodating the dry clutch makes a stroke following the stroke motion of the piston.

The return spring is interposed between the piston arm and the side wall of the clutch drum, and imparts to the piston arm a biasing force in the clutch release direction during the opening or release of the dry clutch.

The elastic seal member is sealing the through hole and the arm distal end from the clutch chamber fixed to the side wall of the clutch drum for elastic deformation in response to the stroke motion of the arm distal end.

The arm fixing plate is provided integrally with the elastic seal member and is fixed to the arm distal end portion to transmit the clutch engagement force by contacting clutch plate during the dry clutch engagement.

As described above, the arm fixing plate is fixed to the distal end portion of the piston arm and is configured to provide a biasing force of the return spring to both the piston arm and arm fixing plate. Therefore, at the clutch release transition period from the clutch engagement state to release or open state, upon release of oil pressure to the piston, by way of the biasing force of the return spring, the integrated piston arm and arm fixing plate makes a stroke quickly in the clutch release direction and shifts to the clutch release state from clutch engagement state.

Further, even in the open state of the dry clutch, the initial biasing force by the return spring is applied to the piston arm and arm fixing plate. Therefore, even if there is vibration input or the like, unless the input exceeds the initial biasing force, the state is maintained and constrained by the initial biasing force. Because this position at the maintained state is the position farthest from the clutch plate of dry clutch, the gap between the adjacent clutch plates is ensured.

As a result, it is possible to improve release response in the clutch release transition period and to prevent the drag of the clutch plate in the clutch release state.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
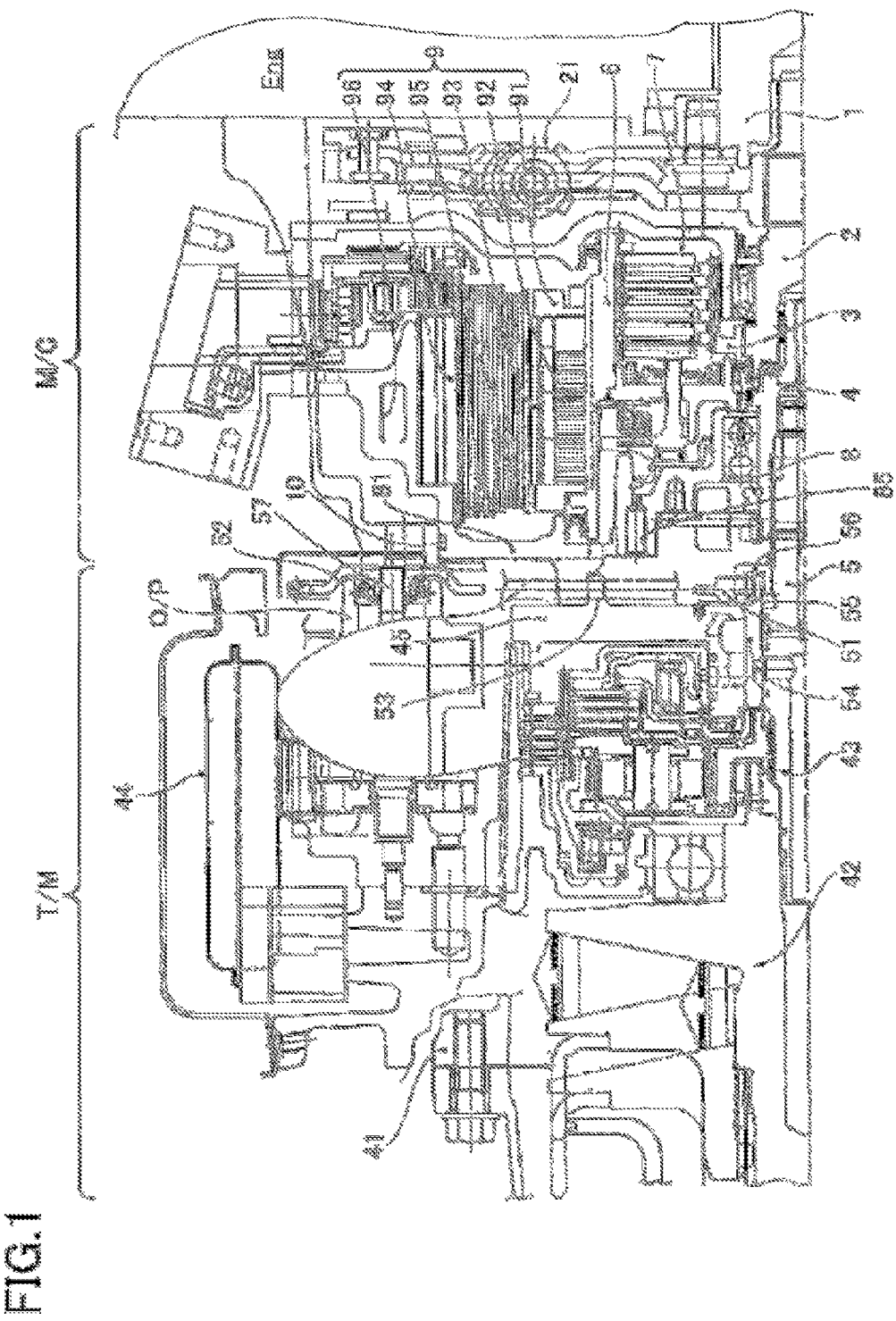
FIG. 1 is an overall schematic view showing a hybrid driving force transmission device (one example of driving force transmission device) in the first embodiment according to the present invention.

A hybrid driving force transmission device according to the present invention will be explained in detail hereinafter with reference to a first embodiment shown in the accompanying drawings, FIG. 1 is an overall schematic diagram showing a hybrid drive force transmission device according to the first embodiment (an example of a driving force transmission device). Hereinafter, the overall configuration of the device will be described based on FIG. 1.

The hybrid driving force transmission device in the first embodiment includes an engine Eng, a motor and clutch unit M/C, a transmission unit T/M, an engine output shaft 1, a clutch hub shaft 2, a clutch hub 3, a clutch drum shaft 4, a transmission input shaft 5, a clutch drum 6, a dry clutch 7, a slave cylinder 8, and a motor/generator 9, as shown in FIG. 1. Here, the slave cylinder 8 to control an engagement and disengagement states is in general referred to as a CSC (abbreviation for Centric Slave Cylinder).

The hybrid driving force transmission device according to the first embodiment has an electric vehicle running mode in which the motor/generator 9 and the transmission input shaft 5 are connected through the clutch drum 6 and the clutch drum shaft 4 when the multiple-plate dry clutch 7 which is normally in a releasing state is in the releasing state, and a hybrid vehicle running mode in which the engine Eng and the motor/generator 9 are connected through the multiple-plate dry clutch 7 by connecting the engine output shaft 1 and the clutch hub shaft 2 through a damper 21, and the clutch hub 3 and the clutch drum 6 are connected through the engaged multiple-plate dry clutch 7.

The motor and clutch unit M/C includes the multiple-plate dry clutch 7, the slave cylinder 8, and the motor/generator 9. The multiple-plate dry clutch 7 is connected to the engine Eng and configured to connect and disconnect the transmission of a driving force from the engine Eng. The slave cylinder 8 controls the engaging and the disengaging of the multiple-plate dry clutch 7 by an oil pressure. The motor/generator 9 is disposed at an outer peripheral position of the clutch drum 6 disposed outside the multiple-plate dry clutch 7 to transmit the driving force of the motor/generator 9 to the transmission input shaft 5. A cylinder housing 81 including a first clutch pressure oil passage 85 connecting to the slave cylinder 8 is provided on the motor and clutch unit M/C through an O-ring 10 while maintaining the sealing property.

The motor/generator 9 is a synchronous type-alternate current electric motor and includes a rotor supporting frame 91 provided integrally with the clutch drum 6, a rotor 92 which is fixedly supported by the rotor supporting frame 91 and in which a permanent magnet is embedded, a stator 94 disposed outside the rotor 92 with an air gap 93 and fixed to the cylinder housing 81, and a stator coil 95 wound on the stator 94. Meanwhile, a water jacket 96 to pass cooled water is provided in the cylinder housing 81.

The transmission unit T/M is connected to the motor and clutch unit M/C and includes a transmission housing 41, a V belt type-continuously variable mechanism 42, and an oil pump O/P. The V belt type-continuously variable transmission mechanism 42 is housed in the transmission housing 41, and configured to acquire a step-less variable transmission or speed ratio by wrapping a V belt between two pulleys and changing a contacting diameter of the pulleys coming in contact with the belt. The oil pump O/P is an oil pressure source which supplies an oil pressure to required parts, makes an oil pump pressure as an original pressure, and supplies an oil pressure from a control valve (not shown) which adjusts a variable oil pressure to a pulley chamber, a clutch and braking oil pressure or the other required locations. The transmission unit T/M is further provided with a mechanism 43 for changing forward and backward running of a vehicle, an oil tank 44, and an end plate 45. The end plate 45 includes a second clutch oil pressure passage 47 (FIG. 2).

The oil pump O/P is configured to perform pump driving by receiving a rotational driving torque of the transmission input shaft 5 through a chain driving mechanism. The chain driving mechanism includes a drive side sprocket 51 rotating in accordance with the rotational driving of the transmission input shaft 5, a driven sprocket 52 rotating a pump shaft 57, and a chain wound on the driving side sprocket 51 and the driven sprocket 52. The drive side sprocket 51 is disposed between the transmission input shaft 5 and the end plate 45 and rotatably supported on a stator shaft 54 fixed to the transmission housing 41, through a bush 55. The rotational driving torque from the transmission input shaft 5 is transmitted to the drive side sprocket 51 through a first adapter 56 which is configured to be splined to the transmission input shaft 5 and to be connected to the drive side sprocket 51 by a hook structure.

Figure 2:
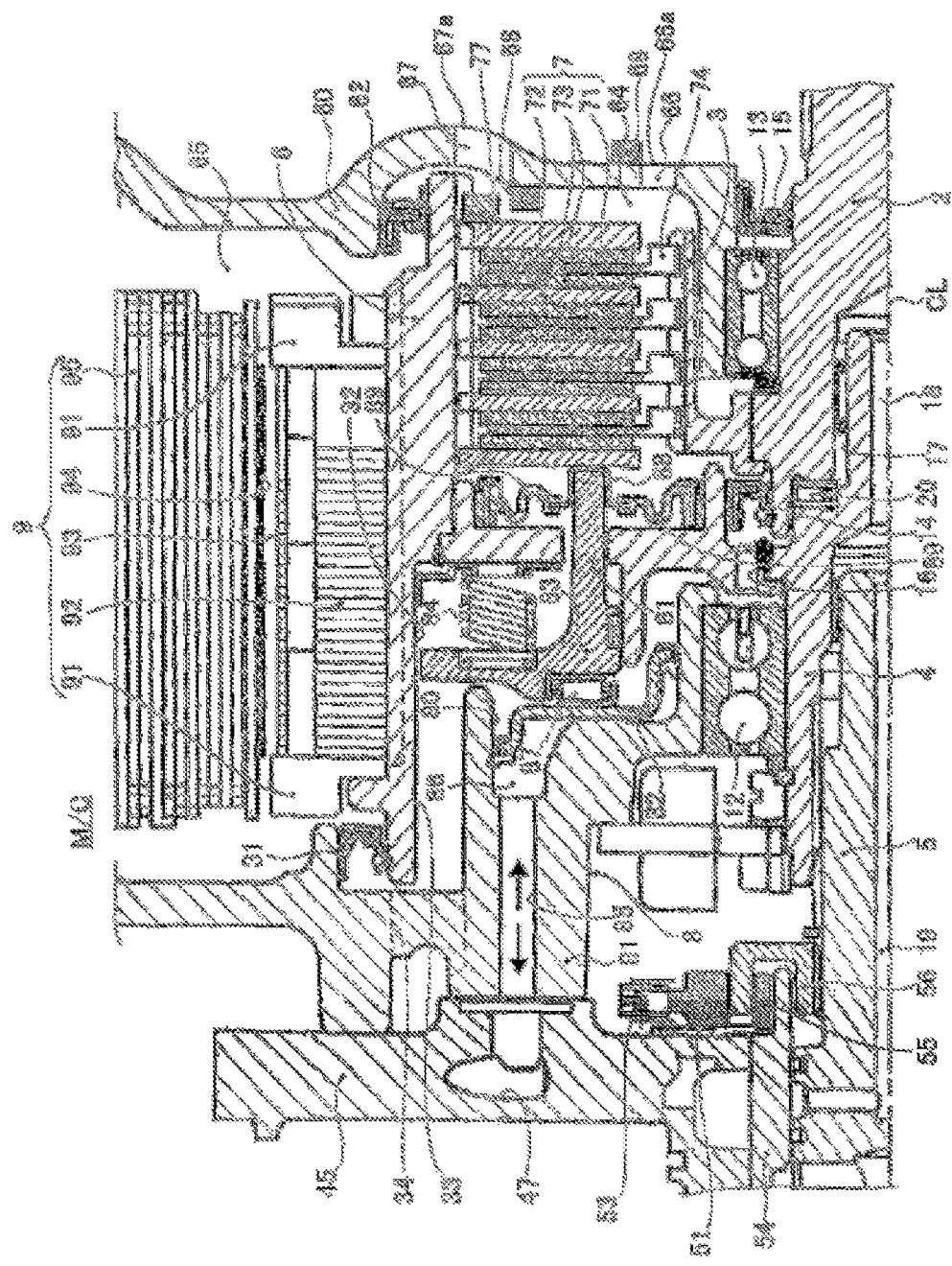
FIG. 2 is a sectional view showing a structure of main part of a motor and clutch unit in the hybrid driving force transmission device in the first embodiment.

FIG. 2 is a sectional view showing a main part of the motor and clutch unit M/C in the hybrid driving force-transmission device according to the embodiment, and FIGS. 3 to 6 are views showing various components of the multiple-plate dry clutch in the hybrid driving force transmission device according to the embodiment. The configurations of the multiple-plate dry clutch 7 in motor and clutch M/C as well as the slave cylinder 8 are described respectively hereinafter with reference to FIGS. 3 to 6.

The clutch hub 3 is connected to the engine output shaft 1 of the engine Eng. The multiple-plate dry clutch 7 includes drive plates 71 (clutch plates) which are splined to the clutch hub 3, as shown in FIG. 2.

The clutch drum 6 is connected to the transmission input shaft 5 of the transmission unit T/M. The multiple-plate dry clutch 7 includes driven plates 72 (clutch plates) which are splined to the clutch drum 6, as shown in FIG. 2.

The multiple-plate dry clutch 7 is interposed between clutch hub 3 and clutch drum 6 in such a way that a plurality of drive plate 71 with friction facing 73, 73 attached on both surfaces and a plurality of driven 72 are arranged alternately. In other words, torque is transmitted (connected) between the clutch hub 3 and the clutch drum 6 by engaging (fastening) the multiple-plate dry clutch 7, and torque is disconnected between the clutch hub 3 and the clutch drum 6 by disengaging (releasing) the multiple-plate dry clutch 7.

The slave cylinder 8 is an oil pressure actuator to control the engagement and the releasing of the multiple-plate dry clutch 7 and is disposed between the transmission unit T/M and the clutch drum 6. The slave cylinder 8 includes a piston 82 provided slidably in a cylinder chamber 80 of the cylinder housing 81, the first clutch pressure oil passage 85 provided in the cylinder housing 81 and configured to guide a clutch pressure made by the transmission unit T/M, and a cylinder oil chamber 86 communicating with the first clutch pressure oil passage 85, as shown in FIG. 2. A needle bearing 87, a piston arm 83, a return spring assembly 84 and an arm press-fitting plate 88 are disposed between the piston 82 and the multiple-plate dry clutch 7, as shown in FIG. 2.

The piston arm 83 is provided slidably in a through-hole 61 provided in the clutch drum 6 and configured to generate a pressure force among the clutch plates of the multiple-plate dry clutch 7 by a pressure force from the slave cylinder 8. The return spring 84 is disposed between the piston arm 83 and the clutch drum 6. The needle bearing 87 is disposed between the piston 82 and the piston arm 83, and configured to prevent the piston 82 from being rotated accompanied by the rotation of the piston arm 83. The arm fixing plate 88 is provided integrally with elastic bellows seal member 89, 89 (elastic seal member), and the inner periphery and the outer periphery of the elastic bellows seal member 89, 89 are press-fit to the clutch drum 6. By means of the arm fixing 88 and the elastic bellows supporting member 89, 89, the leaked oil from the piston arm 83 is blocked from flowing into the multiple-plate dry clutch 7. In other words, the arm fixing plate 88 and the elastic bellows supporting member 89 which are fixed hermetically to an attaching position at which the piston arm 83 is attached to the clutch drum 6 function to separate a wet space filled with oil in which the slave cylinder 8 is disposed and a dry space in which the multiple-plate dry clutch 7 is disposed.

Figure 3:
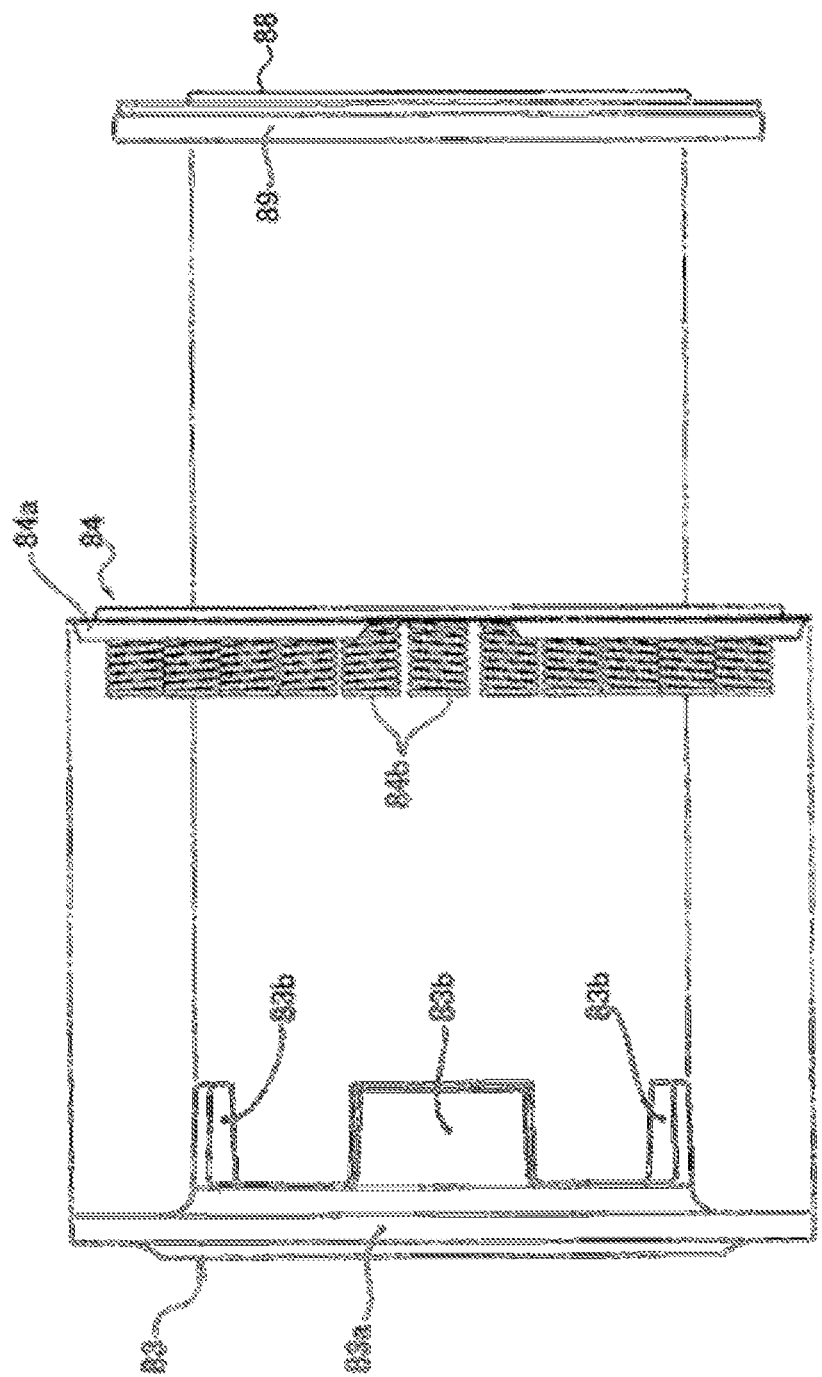
FIG. 3 is an exploded side view showing a piston assembly of the multiple-plate dry clutch in a hybrid driving force transmission device in the first embodiment.
Figure 4:
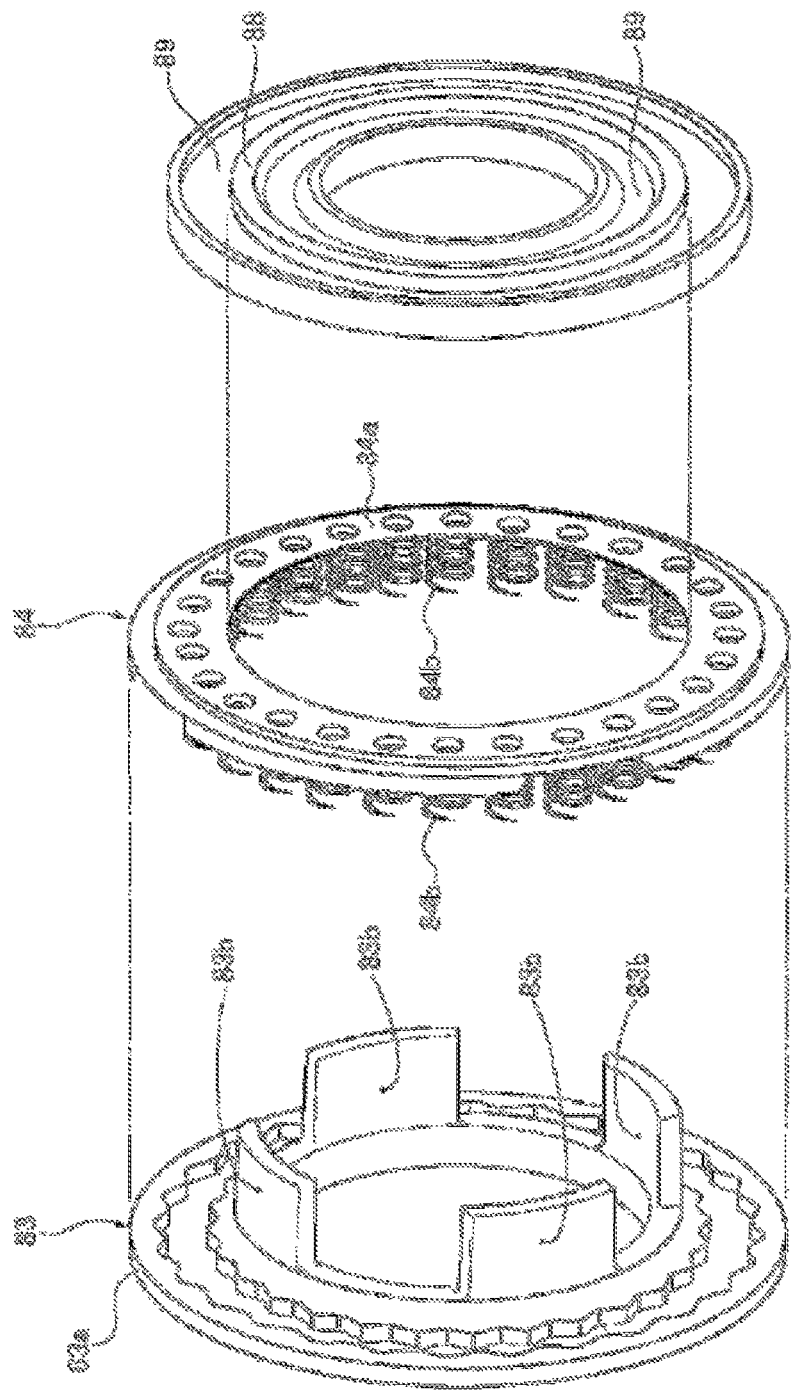
FIG. 4 is an exploded perspective view showing a piston assembly of a multiple-plate dry clutch in the hybrid driving force transmission device in the first embodiment.

The piston arm 83 is composed of a ring-shaped arm body 83a and arm protrusions 83b protruding or projecting from the arm body 83a at four positions around a periphery of the arm body 83a, as shown in FIGS. 3 and 4.

The return spring assembly 84 is composed of a ring-shaped spring supporting plate 84a and a plurality of coil springs 84b fixed to the spring supporting plate 84a, as shown in FIGS. 3 and 4.

The arm projections 83b of the piston arm 83 are press-fit in the arm fixing plate 88, as shown in FIG. 2, and the arm fixing plate 88 is provided integrally at the inner and outer periphery thereof with the elastic bellows seal member 88, as shown in FIGS. 3 and 4.

A leaked oil recovery passage mechanism or circuit in the first embodiment includes a first bearing 12, a first seal member 31, a leaked oil passage 32, a first recovery oil passage 33, and a second recovery oil passage 34, as shown in FIG. 2. More specifically, the leaked oil from a sliding portion of the piston 82 flows to the transmission unit T/M through the first recovery oil passage 33 sealed by the first seal member 31 and the second recovery oil passage 34 communicating 2 with the first recovery oil passage 33. In addition, the leaked oil recovery passage mechanism returns leaked oil from a sliding portion of the piston arm 83 to the transmission unit T/M through the leaked oil passage 32 sealed by a seal partition structure (arm fixing plate, bellows elastic seal member 89, 89), first recovery oil passage 33 sealed by the first seal member 31 and the second oil recovery passage 34.

A bearing lubrication oil passage mechanism in the first embodiment includes a needle bearing 20, a second seal member 14, a first shaft center oil passage 19, a second shaft center oil passage 18, a lubrication oil passage 16, and a clearance 17, as shown in FIG. 2. The bearing lubrication oil passage mechanism circulates bearing lubrication oil from the transmission unit T/M to pass through the needle bearing 20, the first bearing 12 supporting rotatably the clutch drum 6 on the cylinder housing 81, and the needle bearing 87 disposed between the piston 82 and the piston arm 83, and return to the transmission unit T/M, thereby lubricating the aforementioned bearings.

The second seal member 14 is disposed between the clutch hub 3 and the clutch drum 6, as shown in FIG. 2. The second seal member 14 is configured to prevent the bearing lubrication oil from flowing from the wet space in which the slave cylinder 8 is disposed into the dry space in which the multiple-plate dry clutch 7 is disposed.

Then, description is made of the detailed configuration of the clutch engagement/release operation system set in the motor and clutch unit M/C on the basis of FIGS. 2-4.

As shown in FIG. 2, the multiple-plate dry clutch 7 is disposed between clutch hub 3 and clutch drum 6 for selectively connecting and disconnecting driving force in response to clutch release and clutch engagement.

The piston 82 is slidably provided in cylinder housing 81, as shown in FIG. 2, and moves to stroke in the clutch engagement direction (in the right direction in FIG. 2) by oil pressure at the engagement of the multiple-plate dry clutch 7.

The piston arm 83 is slidably provided in a through hole 61 formed in the side wall of clutch drum 6, and the arm projection 83b (arm distal end) projecting into a clutch chamber 64 accommodating the multiple-plate clutch makes a stroke following the stroke motion of piston 82 (FIGS. 3, 4). This piston arm 83 is made of aluminum alloy material. Note that the dry chamber or space is partitioned by seal member 62 to form clutch chamber 64 and motor chamber 65, respectively.

The return spring 34 is interposed between the side wall of clutch drum 6 and piston arm 83 to give a biasing force to piston arm 83 in the clutch release direction during the open or release state of the multiple-plate clutch 7 (FIGS. 3, 4)

As shown in FIG. 2, the bellow-type elastic seal member 89, 89 is press-fitted to the side wall position of the clutch drum 6, that seals from the clutch chamber 64, the through hole 61 and arm projection or ridge or projection 83b, and undergoes elastic deformation following a stroke movement of arm ridge 83b. This bellows elastic seal member 89, 89 is of a rubber-based material, and has an S-shaped cross-sectional shape to impart the arm fixing plate 88 with the elastic restoring force during release state of multiple-plate dry clutch. In addition, the fixed position of the bellow elastic seal 89, 89 with respect to arm fixing plate 88 is positioned, as shown in FIG. 2, by offsetting in the cylinder housing 81 than the arm end. In other words, the fixed position of the bellows elastic seal member 89, 89, is located somewhere at the middle position of protrusion or ridge 83b of the arm protruding into the clutch chamber 64, and the bellow elastic seal member 89, 89 is housed in an axial region between the side wall of clutch drum 6 and the arm end. Through this construction, even when the bellows elastic member is formed in S shaped cross section, the multiple-plate dry clutch does not interfere with the bellows elastic member 89, 89.

As shown in FIG. 2, the arm fixing plate 88 is integrally provided with the bellows elastic seal member 89, 89 by vulcanization bonding, and is press-fitted to the distal end of the arm ridge 83b to transfer the clutch engagement force by contacting driven plate 72 during the engagement time of multiple-plate dry clutch 7. The arm fixing plate 88 is made of metallic material (e.g., stainless steel) with lower thermal conductivity compared to the steel.

First, the "problem of the comparative example" is explained. Subsequently, description is made regarding the operation of the hybrid driving force transmission device in the first embodiment by dividing "clutch engagement/release operation by the slave cylinder" and "release response operation of the multiple-plate dry clutch".

Figure 5:
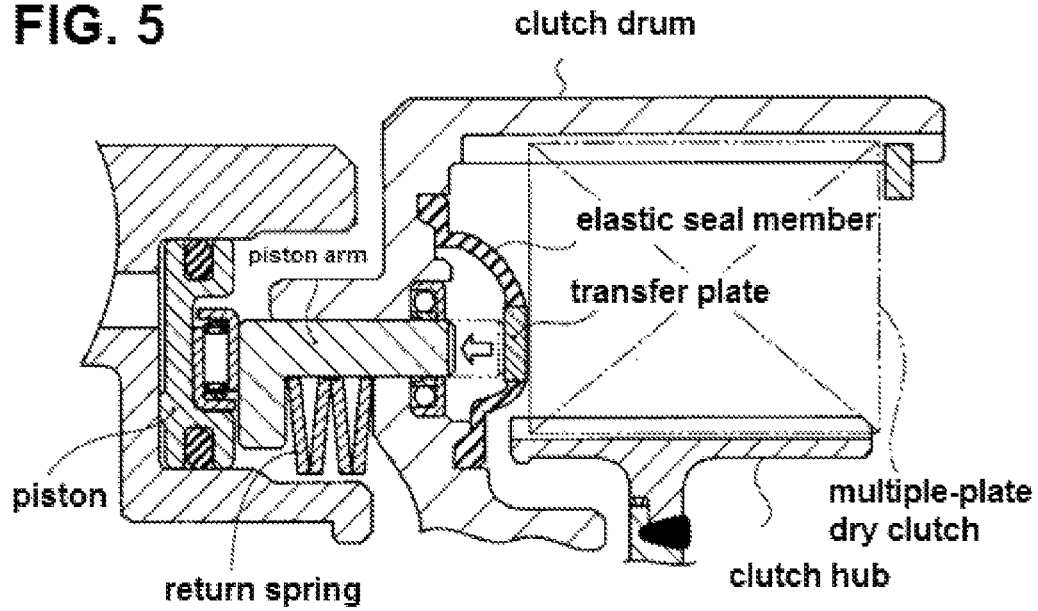
FIG. 5 is an explanatory view showing the operation of the transition operation in the clutch release transition state of multiple-plate dry clutch in a hybrid driving force transmission device in Comparative Example.
Figure 6:
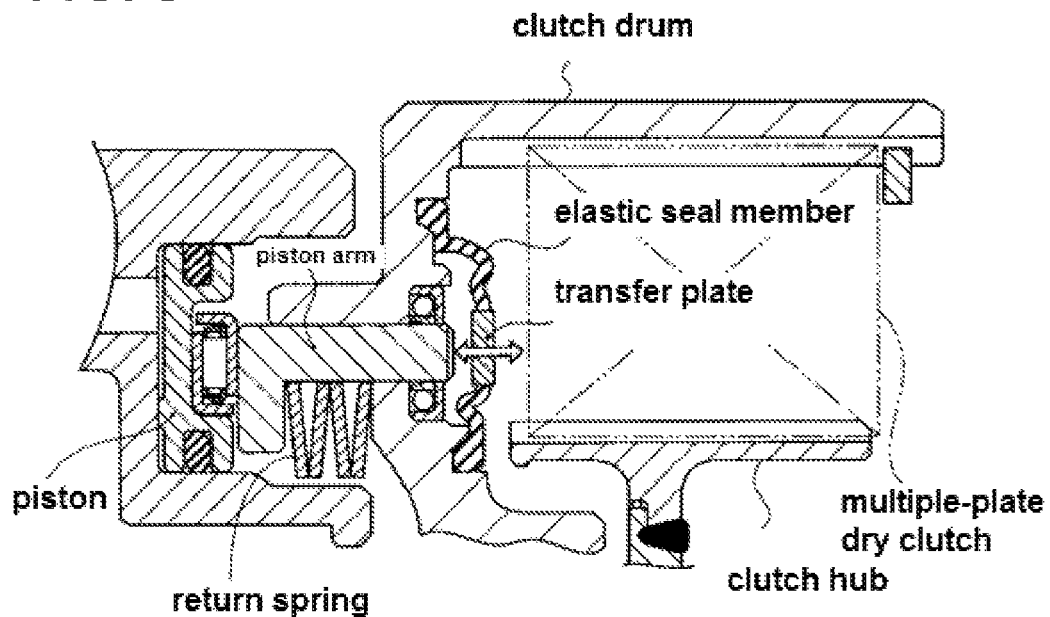
FIG. 6 is an explanatory view showing the operation of the transition operation in the clutch open state of multiple-plate dry clutch in a hybrid driving force transmission device in Comparative Example.

FIGS. 5, 6 are explanatory views showing respectively the operation of the transition operation in the clutch releasing transition state and the clutch release state of multiple-plate dry clutch in a hybrid driving force transmission device in a Comparative Example.

In the Comparative Example, it is assumed that an elastic seal member fixed to side wall of clutch drum and undergoes an elastic deformation in response to the stroke motion of arm distal end of piston arm, and a transfer plate integrally provided with the elastic seal member to transfer the clutch engagement force by contacting clutch plate during the engagement of multiple-plate dry clutch are provided.

In this Comparative Example, as shown in FIGS. 5, 6, the transfer plate is surface contacted to the tip surface of the arm distal end of piston arm and the biasing force of the return spring is imparted to piston arm only.

Therefore, in the clutch release transition period of the multiple-plate dry clutch from the engagement state to the release state, when the transfer plate and clutch plate is being in contact to each other, as shown by arrow in FIG. 5, the piston arm may possibly retracts for backward stroke prior to the transfer plate due to the biasing force of the return spring. In this case, the clutch release response will be delayed until the transfer plate separates from the clutch plate.

And, in a release transition state shown in FIG. 6, the biasing force of the return spring is given to the piston arm only while the transfer plate is just elastically supported by the elastic seal member. Therefore, at clutch release state, upon a vibration input and the like to the transfer plate, as shown by arrow in FIG. 6, the transfer plates oscillates in the input direction to contact the clutch plate of multiple-plate dry clutch to decrease the gap between plates to cause the drag between clutch plates. Note that, when the contact between transfer plate and piston arm, or contact between transfer plate and clutch plate is of metal contact, then hitting sounds may also occur.

Further, especially in the case of the hybrid drive system, a multi-plate dry clutch is released when the mode transition occurs to the "electric vehicle drive mode" from the "hybrid vehicle drive mode". Therefore, the drag torque occurs due to delay in clutch release response open clutch, or during clutch release state, this drag torque leads to loss in driving force, resulting in the deterioration of fuel consumption.

A clutch engaging-disengaging operation to engage and release the multiple-plate dry clutch 7 is now explained with reference to FIG. 2.

When the multiple-plate dry clutch 7 is engaged by the slave cylinder 8, a clutch oil pressure produced by the transmission unit T/M is supplied to the cylinder oil chamber 86 through the first clutch pressure oil passage 85 provided in the cylinder housing 81. Thus, an oil pressure force or hydraulic force corresponding to a value obtained by multiplying the oil pressure by a receiving pressure area is applied to the piston 82 to move the piston 82 in a right direction as viewed in FIG. 2 against a biasing force of the return spring assembly 84 disposed between the piston arm 83 and the clutch drum 6. In addition, an engagement force for the clutch which corresponds to a difference between the oil pressure force and the biasing force is transmitted to the arm fixing plate 88 through the piston 82, the needle bearing 87, and the piston arm 83. Consequently, the drive plates 71 and the driven plates are forcibly contacted to engage the multiple-plate dry clutch 7.

When releasing the multiple-plate dry clutch 7 which is in the engagement state, an operational oil supplied to the cylinder oil chamber 86 is returned to the transmission unit T/M through the clutch pressure oil passage 85, thereby reducing the oil pressure force applied to the piston 82, the biasing force of the return spring 84 exceeds the oil pressure force, thereby the piston arm 83 and the arm fixing plate 88 which are structured integrally move in the left direction as viewed in FIG. 2. Consequently, the engagement force applied to the arm fixing plate 88 is disconnected to release the multiple-plate dry clutch 7.

Figure 7:
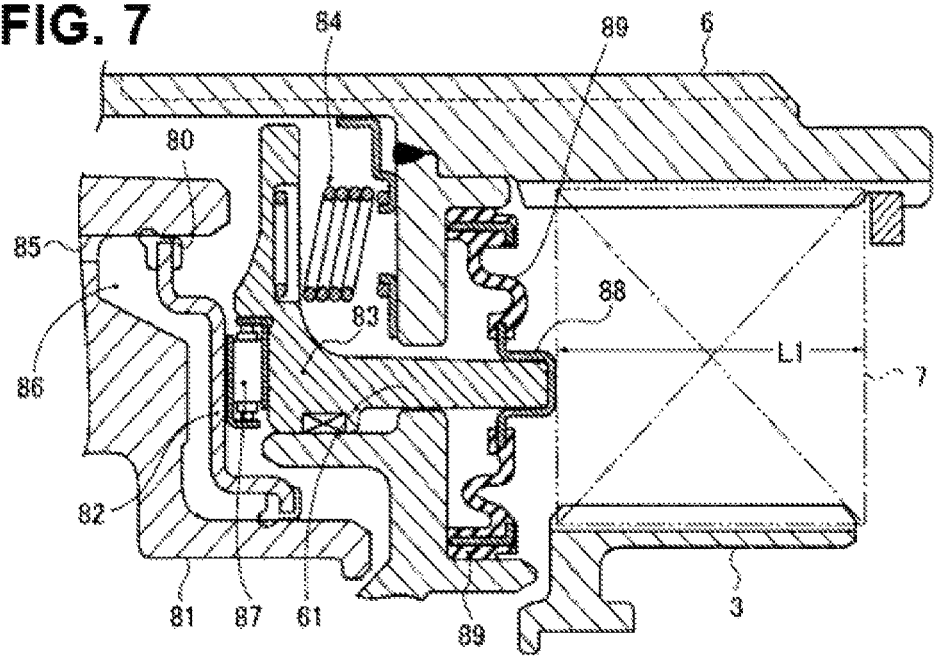
FIG. 7 is an explanatory view showing an operation of clutch engagement of multiple-plate dry clutch in a hybrid drive force transmission device in the first embodiment.
Figure 8:
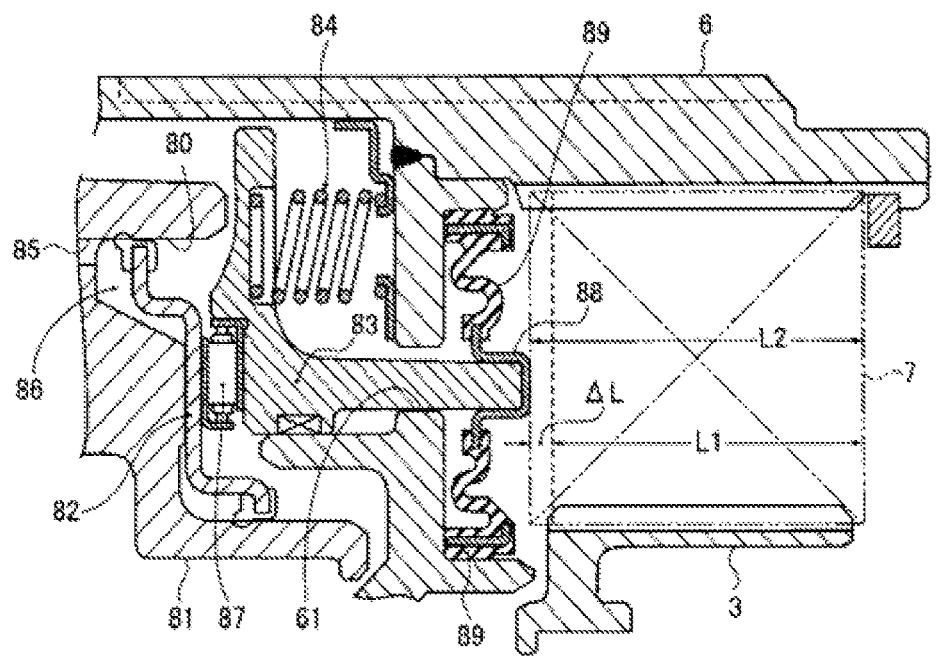
FIG. 8 is an explanatory view showing an operation of clutch release of the multiple-plate dry clutch in a hybrid drive force transmission device in the embodiment.

FIGS. 7 and 8 are explanatory views showing a clutch engagement operation of multiple-plate dry clutch as well as a clutch release operation in a hybrid driving force transmission device in the first embodiment. Now, with reference to FIGS. 7 and 8, the release response operation of the multiple-plate dry clutch 7 will be explained.

Description of the operation of the clutch release transition period is made in which the multiple-plate dry clutch 7 shifts from the engagement state shown in FIG. 7 to the release state shown in FIG. 8. The arm fixing plate 88 in the first embodiment is fixed to the distal end of arm projection or ridge 83b of piston arm 83, and the biasing force by the return spring 84 is configured to be given to both piston arm 83 and arm fixing plate 88. Therefore, when oil pressure to piston 82 is released from the engagement state in FIG. 7, the biasing force of return spring 84 separates promptly the arm fixing plate 88 from clutch plate of multiple-plate dry clutch 77, thereby allowing an integrated piston arm 83 and arm fixing plate 88 to stroke quickly in the clutch release direction. Consequently, a shift will be made from the clutch engagement state in FIG. 7 to the clutch release state in FIG. 8 within a short time with good responsiveness.

In this case, since the elastic seal member is formed in a bellows elastic seal member, the elastic restoring force of the bellows elastic seal member 89, 89 is added to the biasing force of return spring 84, a further improvement in clutch release response may be achieved compared to the arrangement imparted by the biasing force only.

Now, description of the operation is made of the open or release state of the multiple-plate dry clutch 7 as shown in FIG. 8. In the first embodiment, even when the multiple-plate dry clutch 7 is in the release state, the initial biasing force by return spring 84 is imparted to both piston arm 83 and arm fixing plate 88. Thus, piston arm 83 and arm fixing plate 88, even at receiving vibration input and the like, are maintained in a standby state restrained by the initial biasing force in the clutch release position as long as the vibration input would not exceed the initial biasing force. This standby position of piston arm 83 and arm fixing plate 88 corresponds to a clutch release position at which both the piston arm and the arm fixing plate 88 are located the farthest of the clutch plate of the multiple-plate dry clutch 7. More specifically, assuming that the axial length of multiple-plate dry clutch is L1, the piston arm 83 and arm fixing plate 88 are maintained at a position of axial length L2 that is a sum of the axial length L1 and a release stroke ΔL. Therefore, the release stroke ΔL is available as a margin gap between adjacent clutch plates for maintaining a release state of multiple-plate dry clutch 7 without drag.

In this manner, in the first embodiment, arm fixing plate 88 is fixed to a distal end of arm projection or ridge 83b of piston arm 83 such that the biasing force of return spring 84 is configured to be imparted to both piston arm 83 and arm fixing plate 88. Therefore, the release response may be improved during clutch release transition period and the drag of clutch plates in clutch release state may be prevented.

In the first embodiment, the elastic seal member is formed in bellows shaped cross section so that the elastic seal member 89, 89 imparts an elastic restoring force to arm fixing plate 88 in the clutch release side. Therefore, compared with the case where the multiple-plate dry clutch 7 is urged to be opened only by biasing force of return spring 84, the release response in the clutch release transition period will further be improved.

In the first embodiment, the bellows elastic seal 89, 89 is made of rubber material while the arm fixing plate 88 is made of metal material of lower thermal conductivity compared with steel. More specifically, a friction clutch such as multiple-plate dry clutch 7, generates the frictional heat due to clutch slip and the like. At this time, if arm fixing plate is made of material of higher thermal conductivity, the frictional heat received by the arm fixing plate from the friction clutch transfers will be conducted to the elastic seal member, thereby urging the thermal deterioration of the elastic seal member. In contrast, by using a metal material with low thermal conductivity, improvement in durability and reliability of the bellows elastic seal member may be achieved by suppressing transmission of frictional heat received from the multiple-plate dry clutch 7 to the bellows elastic seal member 89, 89.

Now description is made of the technical effects.
In the hybrid drive force transmission device of the first embodiment, the effects listed below may be achieved.

The hybrid driving force transmission device is provided with:
a dry clutch (multiple-plate dry clutch 7) interposed between clutch hub 3 and clutch drum 6 in the driving force transmission system or driveline for selectively disconnecting and connecting driving force by clutch release and engagement operations; a piston 82 disposed in housing member (cylinder housing 81) slidably to stroke in the clutch engagement direction by oil pressure during engagement of the dry clutch (multiple-plate dry clutch 7); a piston arm 83 disposed slidably in through hole 61 formed in the clutch drum 6 to allow the arm distal end (arm projection or ridge 83b) projecting into clutch chamber 64 accommodating the dry clutch (multiple-plate dry clutch 7) to make a stroke following the stroke movement of the piston 82; a return spring 84 interposed between a side wall of the clutch drum 6 and the piston arm 83 for imparting a biasing force to the piston arm 83 in the clutch releasing direction during the release period of the dry clutch (multiple-plate dry clutch 7); an elastic seal member (bellows elastic seal member 89, 89) fixed to the side wall of the clutch drum 6 sealing the through hole 61 and the arm distal end (arm ridge 83b) from the clutch chamber 64 to undergo elastic deformation to follow the stroke motion of the arm distal end (arm ridge 83b); and an arm fixing plate 88 integrally provided with the elastic seal member (bellows elastic seal member 89, 89) and fixed to the arm distal end (arm ridge 83b) to transfer clutch engagement force by contacting the clutch plate (drive plate 71, driven plate 7) during engagement of the dry clutch (multiple-plate dry clutch 7).

Therefore, the release response during clutch release transition period may be improved while preventing the drag of clutch plates (drive plate 71, driven plate 72) during the clutch release state.

(2) The elastic seal member is formed in a bellows elastic seal member 89, 89 of bellows shaped cross section to impart an elastic restoring force to the arm fixing plate to return in the clutch releasing side at clutch release.

Therefore, in addition to the effect of (1), compared to the case of releasing or opening the multiple-plate dry clutch 7 by the biasing force of return spring 84 only, a further improvement in the release responsiveness at the clutch release transition period may be expected.

(3) The elastic seal member (bellows elastic seal member 89, 89) is made of rubber based material while the arm fixing plate 88 is made of metal material of lower thermal conductivity than steel.

Therefore, in addition to the effects of (1) or (2) above, by suppressing frictional heat received from the multiple-plate dry clutch 7 from conducting to the bellows elastic seal member 89, 89, the bellows elastic seal member 89, 89 can be improved in durability and reliability.

(4) The dry clutch is a multiple-plate dry clutch 7, which is interposed between an engine Eng and a motor (motor/generator 9) of the hybrid drive system, The multiple-plate dry clutch 7 uses the engine and the motor (motor/generator 9) as power source in the running mode (hybrid running mode) of clutch engagement, and uses the motor (motor/generator 9) as power source in the running mode (electric vehicle running mode) in response of clutch release. Thus, in addition to effects of (1) to (3), when releasing the multiple-plate dry clutch 7 in response to the running mode transition, the drag torque will be prevented from occurring and improvement in fuel economy may be achieved.

Although the explanation has been made with reference to the first embodiment of the driving force transmission device according to the present invention, design changes and additions are allowed as long as the spirit of the present invention defined in each claim will not be departed.

In the first embodiment, an example has been shown as an example of dry clutch, an example of using a single-plate dry clutch or the like is feasible.

In the first embodiment, an example is shown in which drive plate 71 is splined to the clutch hub 3 while driven plate 72 splined to clutch drum 6. However, as the case may be, the drive plate may be splined to the clutch drum and the driven plate splined to the clutch hub.

In the first embodiment, an example is shown in which drive plate 71 has a friction facing 73. However, as the case may be, the driven plate may have a friction facing.

In the first embodiment, an example is shown in which piston arm 83 is formed to have arm projection or ridge 83b. However, for example, as described in the prior art, the arm may have an arm pin.

In the first embodiment, an example is shown in which return spring 84 is configured as a plurality of coil springs 84b. However, for example, as described in the prior art, a disc spring may be an alternative.

In the first embodiment, an example of application to the hybrid driving force transmission device with an engine and motor/generator is shown in which the dry clutch is configured as a running mode transition clutch. However, application to driving force transmission device in an engine driven vehicle may be feasible, that has a dry clutch as starting clutch with only the engine as a drive source.

Furthermore, the invention can also apply to a motor driving force transmission device of electric vehicle and fuel cell vehicle and the like, with the motor/generator only as a power source, and using the dry clutch as starting clutch.

The invention claimed is:
1. A driving force transmission device, comprising:
   a dry clutch interposed between a clutch hub and a clutch drum in a driving force transmission system for selectively disconnecting and connecting a driving force by clutch release and engagement operations;
   a piston disposed slidably in a housing member to make a stroke movement in a clutch engagement direction by oil pressure at engagement of the dry clutch;
   a piston arm disposed slidably in a through hole formed in the clutch drum to allow an arm distal end projecting into a clutch chamber accommodating the dry clutch to stroke following the stroke movement of the piston;
   a return spring interposed between a side wall of the clutch drum and the piston arm for imparting a biasing force to the piston arm in a clutch releasing direction during a release period of the dry clutch;
   an elastic seal member fixed to the side wall of the clutch drum sealing the through hole and the arm distal end from the clutch chamber to undergo elastic deformation to follow the stroke of the arm distal end; and an arm fixing plate integrally provided with the elastic seal member and fixed to the arm distal end to transfer clutch engagement force by contacting the clutch plate during engagement of the dry clutch.

2. The driving force transmission device as claimed in claim 1, wherein the elastic seal member is formed in a bellows shaped cross section to impart an elastic restoring force to the arm fixing plate to return in a clutch releasing side at clutch releasing.

3. The driving force transmission device as claimed in claim 1 wherein the elastic seal member is made of rubber based material while the arm fixing plate is made of metal material of lower thermal conductivity than steel.

4. The driving force transmission device as claimed in claim 1, wherein the dry clutch is a multiple-plate dry clutch which is interposed between an engine and a motor of a hybrid drive system, and the multiple-plate dry clutch is operable to use the engine and the motor as a power source in a running mode of clutch engagement and to use the motor as the power source in another running mode in response to clutch release.

\* \* \* \* \*